United States Patent
Horowitz et al.

(10) Patent No.: US 8,180,779 B2
(45) Date of Patent: May 15, 2012

(54) SYSTEM AND METHOD FOR USING EXTERNAL REFERENCES TO VALIDATE A DATA OBJECT'S CLASSIFICATION / CONSOLIDATION

(75) Inventors: Yoram Horowitz, Kazmiel (IL); Avi Malamud, Kiriat Motzkin (IL)

(73) Assignee: SAP AG, Walldorf (DE)

( * ) Notice: Subject to any disclaimer, the term of this patent is extended or adjusted under 35 U.S.C. 154(b) by 668 days.

(21) Appl. No.: 11/322,381

(22) Filed: Dec. 30, 2005

(65) Prior Publication Data
US 2007/0162414 A1    Jul. 12, 2007

(51) Int. Cl.
*G06F 7/00*    (2006.01)
*G06F 17/30*    (2006.01)

(52) U.S. Cl. ......... 707/740; 707/750; 707/780; 707/948

(58) Field of Classification Search ......... None
See application file for complete search history.

(56) References Cited

U.S. PATENT DOCUMENTS

| | | | |
|---|---|---|---|
| 6,615,220 B1 * | 9/2003 | Austin et al. | 707/104.1 |
| 6,714,933 B2 * | 3/2004 | Musgrove et al. | 707/10 |
| 6,912,505 B2 * | 6/2005 | Linden et al. | 705/14.53 |
| 7,062,509 B1 * | 6/2006 | Nenov et al. | 707/104.1 |

OTHER PUBLICATIONS

Melnik, S., H. Garcia-Molina, E. Rahm: Similarity Flooding: A Versatile Graph Matching Algorithm. ICDE 2002.*

* cited by examiner

*Primary Examiner* — Ann Chempakaseril
(74) *Attorney, Agent, or Firm* — Buckley, Maschoff & Talwalkar LLC

(57) ABSTRACT

A computer system and method for validating data object classification and consolidation using external references. The external references may be web pages, product catalogs, external databases, URLs, search results provided by a search engine or subsets or combinations of any of these to validate a classification or consolidation of records. Embodiments validate a data object classification or consolidation decision by searching external data sources, such as databases, the Internet etc. for references to the transactional data object and determining a confidence level based on the original data object and the unstructured information reference, URL, or search result for example. Decisions may be verified or denied based on the comparison of the external references related to each data object. Embodiments of the invention save substantial labor in validating business data objects and make data more reliable across enterprise systems.

14 Claims, 7 Drawing Sheets

Figure 6

| | A | B | C | | D |
|---|---|---|---|---|---|
| 1 | Invoice No. | Supplier SKU | Product Description | | Price $ |
| 2 | 830265 | 069-12-884 | 1/2" DR TORX DRVR T-15 BIT STD BIT CH 12-884 | | $ 9.90 |
| 3 | 7102745643 | 114-11304KIT | BOSCH BRUTE BREAKER 1400 BPM HAMMER KIT W/ CART & S | | $ 999.00 |
| 4 | 654957625541 | 156-6506 | | | $ 58.00 |
| 5 | 8487475492 | 142-3350 | 3M 7090 P100 FILTER (10/BOX) | | $ 70.00 |
| 6 | 7485693263 | 182-CN1290SF590 | 4595 1/2" X 25' LUFKIN DOUBLE DUTY OIL GAUGING tape Chrome | | $ 89.65 |
| 7 | 63932765-54 | 406-93035-6B | 6" 35MIL JOINT WRAP TAPE 93035-6B | | $ 17.55 |
| 8 | AS6r47 | 434-80220 | WHITE B PAINTSTIK 80220 MARKER | | $ 10.77 |
| 9 | 6423945 | 442-24231 | 50-ML THREADLOCKER 242REMOVABLE STRENGTH | | $ 26.88 |
| 10 | 7237y598463 | 464-31144 | WHITE DUSTLESS BOARD CHALK 31-144 | | $ 0.89 |
| 11 | 835247 | 500-42768 | SCOTCHRAP 42768 PIPE PRIMER | | $ 66.80 |
| 12 | 265409842 | 632-31025 | 18 STEEL HD 31025 PIPE WRENCH | | $ 62.25 |
| 13 | 29845503 | 652-63705 | YELLOW UNI PAINT MARKERPX-21 FINE LINE 63705 | | $ 3.00 |
| 14 | 73290597 | 680-15-206 | 15-206 WALLBOARD SAW 6" | | $ 4.99 |
| 15 | 8345292 | 680-33-312 | TAPERULE PL312 YELLOW 3/ | | $ 14.95 |

601

602

BOSCH BRUTE BREAKER 1400 BPM HAMMER KIT W/ CART & S

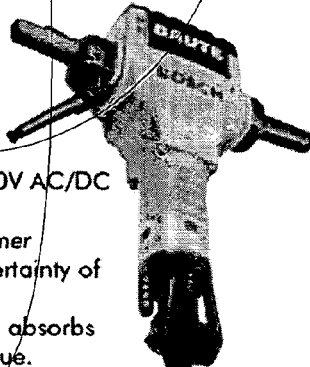

BRUTE™ BREAKER HAMMER

BOSCH

Model 11304
- 15.0 Amp Motor 1,400 BPM.
- Totally portable – runs on 115-120V AC/DC or 2500-watt portable generator.
- Pre-lubricated gear box and hammer mechanism eliminates uncertainty of job-site lubrication.
- Shock-mounted handles absorbs vibration to reduce fatigue.

Brute™ Hammer Kit Model 11304K
Includes Brute Breaker Hammer (11304), two moil points, two narrow chisels, and one hammer hauler.

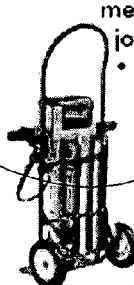

603

SYSTEM AND METHOD FOR USING EXTERNAL REFERENCES TO VALIDATE A DATA OBJECT'S CLASSIFICATION / CONSOLIDATION

BACKGROUND OF THE INVENTION

1. Field of the Invention

Embodiments of the invention described herein pertain to the field of computer systems and software. More particularly, but not by way of limitation, one or more embodiments of the invention are directed to computer systems and methods for validating data object classification and consolidation using external references.

2. Description of the Related Art

Corporate data typically resides in multiple disparate systems, databases, spreadsheets, email and other applications across an enterprise. Where there are multiple locations and versions for an item of data, there are data consistency problems. For instance, in a case where only a most current version is needed and two different versions of the same basic data may exist business decisions and business processes that utilize alternate versions of this data are error prone and can lead to costly mistakes. Errors resulting from data inconsistency eventually lead to a decreased ability to make effective decisions. There are various approaches to resolving this data integrity problem one of which involves the use of a locally controlled and maintained database. Such an approach however is impractical in that effective enterprise systems for implementing business processes must generally make use of internally maintained data and externally generated data that varies more than data that is locally controlled, formatted and maintained within an organization. This internal and external data is provided to systems for implementing one or more business processes in the form of data objects.

An example of an external data object is any document or data presented to an organization from an outside entity such as a vendor or contractor. These external data objects are generally formatted inconsistently and differ from vendor to vendor. For example, invoices from multiple vendors may contain an item categorized as "printer paper" in one invoice, while in another invoice the same item may be categorized as "office supplies" or "stationery." The same item may be presented in invoices with multiple differing part numbers unique to each vendor as well. It is for these and other reasons that the purchase of a particular item from different sources across an enterprise requires significant additional manual labor. The inability to group purchases for items belonging to a category for example reduces the likelihood of negotiating a better price for the item from a single vendor. This example is not unique to transactional processing. All business areas and business processes that utilize duplicative data suffer higher costs and higher failure rates for a variety of reasons. For example, publication of out-of-sync information to a catalog, website or data pool can magnify duplicative, old or erroneous data and prove costly to other areas of a business that must then deal with the consequences of the problem data.

It is commonplace for any relatively sophisticated business process to also make use of internal data objects. An example of an internal data object is any document or data generated within an organization for internal and sometimes or external use. To make effective business decisions competitive businesses generally utilize internal business data as part of the decision making process. When the data in these systems is not shared throughout the organization to the key decision makers and made consistent, inefficiencies occur. Achieving consistent data across multiple distributed heterogeneous systems within an organization is difficult. Establishing effective communication links between disparate systems is a prerequisite to making the data consistent, but does not alone solve the problem. Even when internal data is effectively shared throughout an organization, problems still arise in that over the course of time the data may exist in different forms and models. Since the achievement of data consistency is difficult it is common for companies to maintain internal data in independent realms. For example, because of the difficulties associated with merging internal data, some companies independently maintain data for each of their different corporate divisions and only utilize such data for business decisions relevant to a particular corporate division. The maintenance of independent systems often occurs after mergers and acquisitions where company systems are almost certainly heterogeneous and typically utilize radically different structures and data models.

Regardless of the origin of data, whether internal or external, organizations typically seek to coordinate interaction between heterogeneous systems to minimize redundant data. Current business systems begin by classifying and/or identifying similar and overlapping data and then coordinating the integration of such data in a way that ensures the data stays consistent across different systems. One approach some organizations use is to maintain what is known as master data. Master data may be thought of as the definitive version of a data object and may include customer, product, supplier and employee data for example. Known solutions for coordinating the master data, i.e., classifying, storing, augmenting and consolidating, are generally insufficient. Moreover, the fact that master data may exist does little to provide information technology personnel with insight about the process used in determining if an object matches another object or belongs to an existing classification or validating these decisions. Failing to successfully coordinate master data objects yields data object redundancies and inconsistencies that disrupt the business decision-making process and increase the overall cost of doing business. In cases where customer data is included into the master data and becomes out of sync, customer service suffers from incomplete data requiring customers to call multiple places within the same company to obtain the required information. In some cases the failure to efficiently service customers causes enough frustration that it begins to result in decreased customer loyalty and ultimately leads to a loss of customers. By utilizing master data, a business entity may consolidate, synchronize, distribute, centrally manage and publish any type of master data across an enterprise and with trading partners. Utilizing master data enables improved customer acquisition and retention, cross-sell and up-sell, global spend analysis, workforce management, new product introduction, cataloging and publishing, sourcing, procurement, inventory management, shipping and invoicing.

Information about internal and external data objects is exchanged amongst different parts of the system using what is called transactional data. For instance, when new data is submitted or when data objects are updated, modified or deleted transactional data messages are sent to the components of the system that require such information. Transactional data presents challenges to companies that interact with each other when electronically exchanging information. It is possible to transfer transactional data in a multitude of different formats (e.g. EDI, Excel, XML, PDF, Text) and to send this data over numerous networks and network topologies (e.g. AS2, SWIFT) and standards (e.g. EDI-HL7). One of the complexities that exists with respect to the transfer of transactional data is that the data is sometimes incomplete.

Attributes and identifiers may, for instance be abbreviated, incomplete or even missing. In addition, the quantities of transactional data objects and hence the daily updates may be very large and hence require significant system resources. Since the format and content of the transactional data is non-uniform, every batch received may yield minimal reuse of data and/or process decisions. For example, when transactional data such as an invoice is presented to a company, the invoice may be normalized and/or transformed into XML. Each line item may then be classified and/or consolidated with other items in the invoice or within the master data. Generally, applications exist that allow for the classification of items using rules or artificial intelligence. However effective systems for performing automated validation of classification or consolidation decisions made with respect to the transaction data are lacking. Data objects with missing or abbreviated attributes for example may fail classification or even worse may be classified incorrectly if there are chance associations or relationships in the data. Current methods for validating the classification and consolidation of business objects rely on a form of "know it when I see it" manual processing that is labor intensive and error prone. The list of companies that perform classifying, cleansing and normalizing of transactional data objects is large. However, existing solutions do not scale to the transactional quantity required and do not provide the necessary confidence level required to make effective decisions. The reason for this is that existing systems typically use manual work and rely, for example, on two employees separately making classification or consolidation decisions. Although this is in some cases an effective form of validation, it lacks the scalability, automation and confidence needed to be truly effective in an enterprise context. Confidence intervals are a common form of interval estimation. An example of a confidence level is the probability value associated with a confidence interval. If U and V are statistics i.e., "observable" random variables, whose probability distribution depends on some unobservable parameter theta, and Pr (U<theta<V)=x, (where x is a number between 0 and 1) then the random interval (U, V) is a "(100·x)% confidence interval for theta". The number x, or 100·x expressed as a percentage, is then called the confidence coefficient or confidence level.

Manual validation of a classification or consolidation requires time and labor intensive inquiries generally via email or telephone. This process is inefficient when the number of records becomes large. If external references were used in order to corroborate the missing/hidden/abbreviated attributes from records for example, then automated classification and consolidation validation could occur. Because of the limitations described above there is a need for a system and method for validating data object classification and consolidation using external references.

SUMMARY OF THE INVENTION

One or more embodiments of the invention are directed to a system and method for using external references to validate data object classification and consolidation. By automating verification, substantial amounts of manual labor are eliminated. Automated validation of a data object's classification and/or automated validation of a consolidation or merge of two data objects into an existing master data object enables the data used across an enterprise to have a high level of confidence.

Upon receipt of an external data such as an invoice that is presented to an organization, the data which is in this example invoice data, is parsed or translated for example into an external data object (e.g., in XML form) and classified or consolidated with existing master data. Embodiments of the invention are configured to integrate with any system or method of classifying and consolidating data objects. Since the format and content of transactional objects is generally non-uniform, every batch of invoices received for example potentially yields minimal reuse of data or decisions depending upon how the invoice data is classified and consolidated. One method of classification for example involves using rules that specify which portions of a record are required for a record to match a classification or other data record in the case of consolidation. When enough of a record for example belongs to a class, the record is assumed to belong as a whole to the class. In the case of consolidation, the "zip code" portion of a record may be required for consolidation while the "phone number" portion may be of a lower priority. Regardless of the method of classification and/or consolidation, the classification and/or consolidation decision provides an input to embodiments of the invention that may then validate the decision with a definable level of confidence. Hence an input classification refers to a classification that is input to the system for validation.

Embodiments of the invention allow for the validation of classification and consolidation decisions by checking external references to gain confidence as to whether a decision is valid or not. After a decision is made for example that a given data object or record is of a particular classification, embodiments of the invention perform a search using the given data object or record in order to gather external information about the validity of the data. Any data source that is external to the system itself is a potential source of external information and can be used for purposes of validation. An Internet search, for instance which returns a result set of URLs and synopsis of the search results is a form of external validation. Embodiments of the invention may perform a search for example on the classification as well and correlate the two search result URLs or unstructured data returned by the search in order to reach a level of confidence that a similarity exists. For example, if an item is classified as a particular type of tool and the search for the tool classification and search for the item yields no URLs and/or no unstructured text within the search that is in common, there is a high probability that the item does not belong to the classification.

This type of external reference searching to validate master data can also be performed when two data objects or records have been deemed the same and therefore are to be consolidated or merged. By performing two searches and comparing the result sets of URLs or unstructured text within a portion of the result set validation of the consolidation may be performed. If, for example, there are no URLs and/or unstructured text in common for example, then there is a high probability that the two items should not be merged. Although the searching may take time, the resulting decision confidence level merits the searching effort.

Classification and consolidation may be incorrectly attempted or may fail to occur for example when a data object has a missing or abbreviated attribute or coincidental information (e.g., such as on an incoming invoice). In the case of missing or abbreviated attributes, these occurrences may cause a statistical type "0" error wherein a value is outside of a defined confidence level. In many cases, the missing or abbreviated attribute causes a classification or consolidation to fail since the confidence interval determined signifies that there is not enough in common to perform the classification or consolidation. Classification and consolidation may be incorrectly attempted for example when a statistical type "I" error occurs wherein a change relationship exists that confuses the classification or consolidation model into thinking that a relationship does exist. Embodiments of the invention validate classification and consolidation decisions to preclude human intervention except where absolutely necessary as pointed out by the system. By correlating or performing a comparison algorithm capable of determining the similarity between result sets of searches, an acceptable threshold may be met which determines that the external searches signify a high or low probability of a match. The acceptable threshold level is a value that can be set by a user and/or determined by the system to be an acceptable value for purposes of validation. Any threshold level can be set, but preferably the threshold level is any value defined by the user and/or system to be indicative of the intended result. A higher threshold level leads to better the validation, however one or more embodiments of the invention make use of any threshold level defined by the user and/or system. Search results may be cached for example to speed the process of classification validation or consolidation validation.

In the example of invoices, invoices from multiple vendors may contain an item categorized as "printer paper" in one invoice, while in another invoice the same item may be categorized as "office supplies" or "stationery." The item may be presented in invoices with multiple differing part numbers unique to each vendor as well. Embodiments of the invention are configured to perform searches on the classification itself and data object in the case of a classification validation and determine whether the URLs or unstructured text returned from the search are within a threshold of commonality. Likewise, by searching for two data objects using external references, for example in product catalogs, commercially available data sets, or on the Internet, the decision to merge may be validated or denied by comparing the result set of URLs, portions of the URLs such as page numbers or using unstructured text returned by the search. This allows for a high degree of alternate validation to occur before flagging one or more data objects for further investigation. Embodiments of the invention may be utilized with respect to data objects regardless of their origin whether internally or externally generated or maintained.

BRIEF DESCRIPTION OF THE DRAWINGS

FIG. 6 illustrates an example of some data elements utilized in a comparison operation configured to occur in one or more embodiments of the invention.

DETAILED DESCRIPTION OF THE INVENTION

A system and method for validating data object classification and consolidation using external references will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
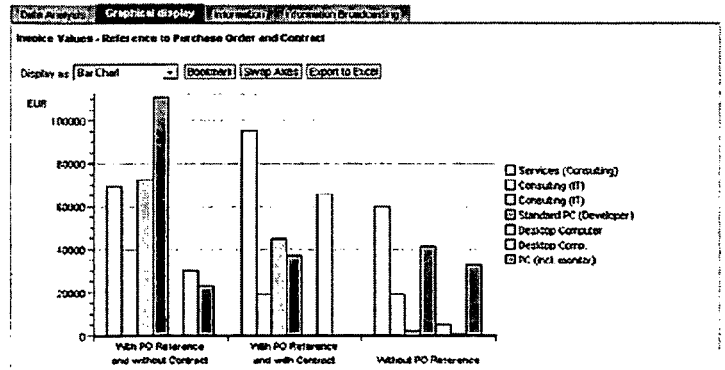
FIG. 1 illustrates a data flow chart in which embodiments of the invention are utilized to validate data.
Figure 2:
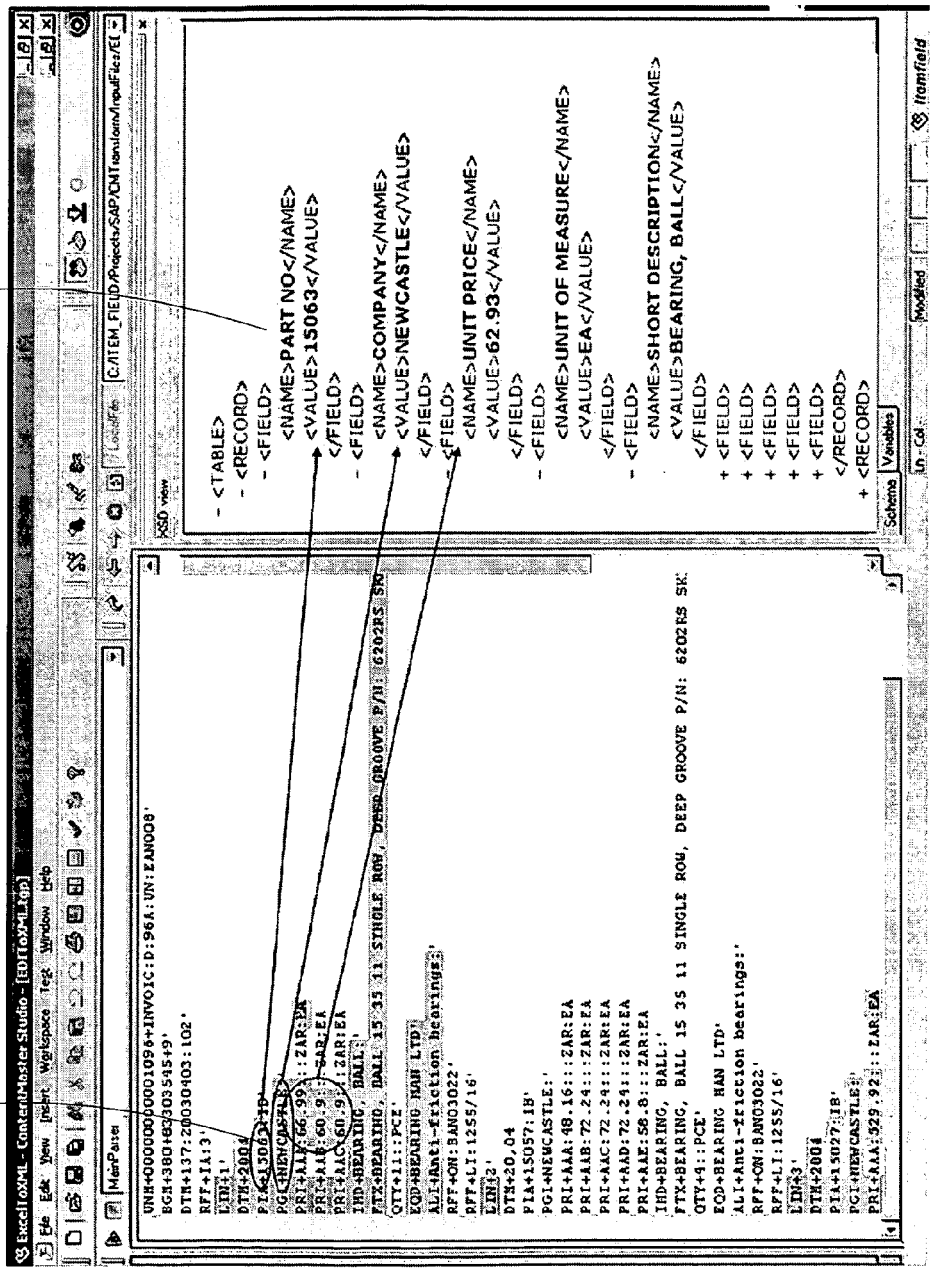
FIG. 2 shows an example application for mapping EDI attributes to XML in accordance with one or more embodiments of the invention.

FIG. 1 illustrates a data flow chart in which one or more embodiments of the invention are utilized to validate classified and consolidated data. One or more embodiments of the invention enable a system and method for using external references to validate data object classification and consolidation. Input data objects 101 may be presented in legacy formats such as EDI, or may be presented in other formats such as PDF, XML or in this example a spreadsheet file. The invention can be used with any type of input data and is described throughout this patent application in the context of an invoice for purposes of example only. The data objects are transformed or parsed or manipulated in any other manner to allow further processing of the data objects at 102. An example application for mapping EDI attributes to XML is shown and further described in FIG. 2. In the example given EDI attribute 201 is mapped to XML data 202. The input data objects depicted in FIG. 1 are created from spreadsheets and the XML versions of data objects are created from EDI input data. However the invention is not limited to such a specific structure and it will be appreciated by one skilled in the art that any type of data may be utilized with an embodiment of the invention so long as the data may be transformed into a format that is capable of allowing searches using external sources (such as the Internet or other structured or unstructured data set able to return references in response to a query). Internet search engines and other type search engines are examples of external sources of data that can be used in accordance with one or more embodiments of the invention. The term external source, however can refer to any data set that is external to the system itself and accessible to validate against.

Embodiments of the invention that make use of external references for purpose of validation may be integrate with any system or method of classifying and consolidating data objects. Since the format and content of transactional objects is generally non-uniform, every batch of input data (e.g., invoices or other input data) received for example may yield minimal reuse of data or decisions depending on the classification and consolidation implementation. One method of classification, for example, involves using rules that specify which portions of a record are required for a record to match a classification or other data record in the case of consolidation. For instance, when enough of a record for example belongs to a class, the record is assumed to belong as a whole to the class. In the case of consolidation, the "zip code" portion of a record may be required for consolidation while the "phone number" portion may be of a lower priority. Regardless of the method of classification and/or consolidation, the classification and/or consolidation decision provides an input to embodiments of the invention that may then validate the decision. The classification and/or consolidation and searching external references and validation of the classification and/or consolidation decision(s) is performed at 103 (see FIG. 3 for expanded detail of this step).

After affirming the decision(s), or alternatively by further processing repudiated decisions manually, the data is stored in a business warehouse, for example a database or a data warehouse at 104. The data, once classified and/or consolidated may then be viewed at 105, for example using a view as shown at 106. Any database or viewing method may be utilized with data that has been verified by an embodiment of the invention. Any type of software or system may be utilized in viewing or analyzing data objects that have been verified to be part of a classification or that have been verified for consolidation utilizing embodiments of the invention. By automating the validation of classification and consolidation decisions, substantial amounts of manual labor are eliminated. In addition, master data thus verified enables the highest possible confidence level data to be utilized across an enterprise.

Figure 3:
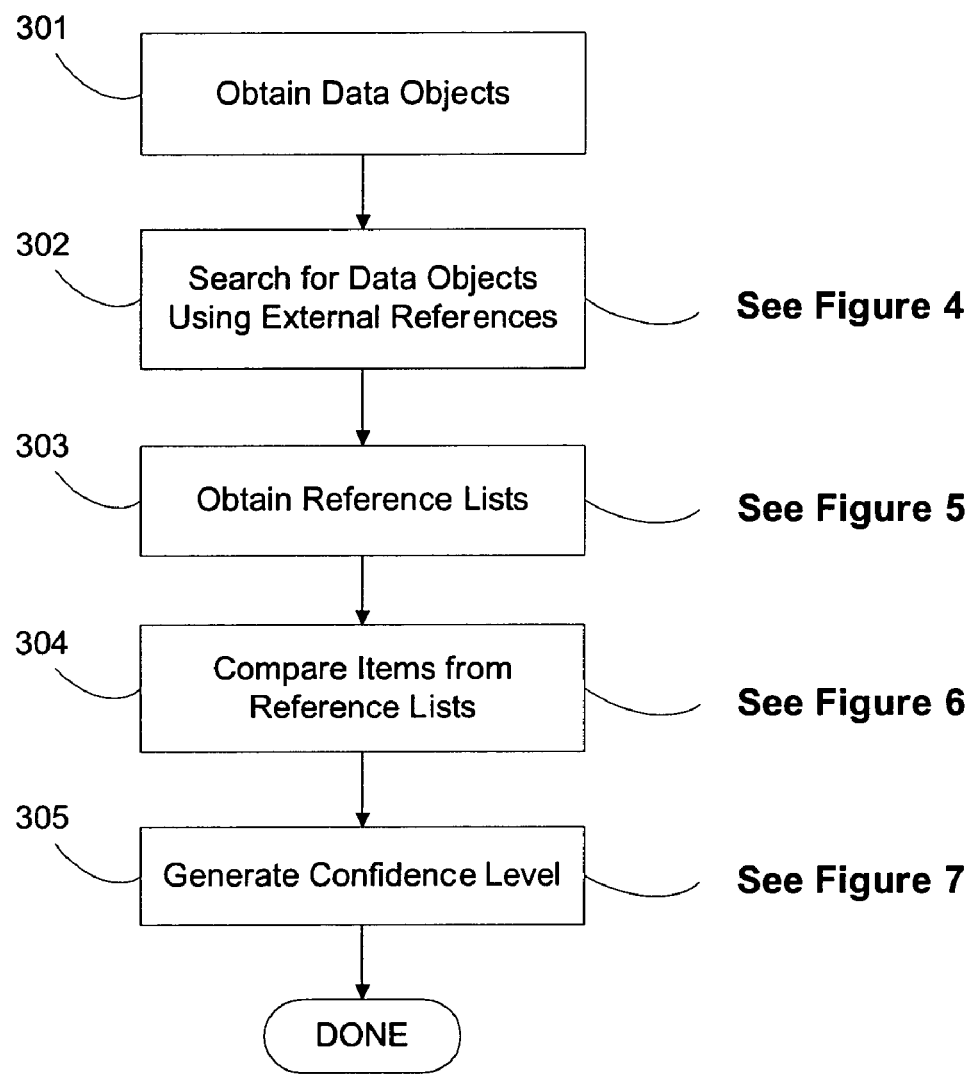
FIG. 3 illustrates a flow chart of the system and method for validating data object classification and consolidation using external references in accordance with one or more embodiments of the invention.

FIG. 3 illustrates a flow chart of the system and method for validating data object classification and consolidation using external references in accordance with one or more embodiments of the invention. Data objects are obtained at 301 and normalized or otherwise preprocessed before being provided for verification. Embodiments of the invention allow for the validation of classification and consolidation decisions by checking external references to determine a confidence level to associate with the validity of the decision made. A search on data objects or records is performed at 302 to gather external reference information. Examples of external references utilized for purposes of determining a confidence level include, but are not limited to Internet search results or product database search results which comprise a result list/set of URLs and/or synopsis of the search results. External reference data may also include other sources of data, such as data that has already been validated or data that is available from commercial providers. Searching allows the system to obtain the reference lists at 303 for purposes of comparison. Items from the result lists are compared at 304 to generate a confidence level at 305 that a similarity exists or does not exist.

For example, if an item is classified as a particular type of tool and the search for the tool classification (or a data object known to be of a classification for example) and search for the data object yields no URLs and/or no unstructured text within the search that is in common, there is a high probability that the item does not belong to the classification. A classification decision is a decision that results in a classification of a data object. If a classification decision was made that the items were similar and the validation steps shown in FIG. 3 do not corroborate this decision, then the decision is repudiated. Repudiation may occur in two manners, if the classification decision was true and the validation shows that no classification should have been made then the decision is repudiated. If the classification decision was false and the validation shows that a classification should have been made, then the classification decision resulting in no classification is repudiated. If the classification decision was false and the validation is below a threshold or false, then the decision is affirmed. Likewise, if the classification decision was true and the validation is above a threshold or true, then the decision is also affirmed. This type of external searching can also be performed when two data objects or records are deemed to be redundant and therefore are to be consolidated or merged. By performing two searches and comparing the resulting sets of data (e.g., URLs and unstructured text) with a portion of the result set to be validated, validation of the consolidation may be performed. If there are no URLs and/or unstructured text in common for example, then there is a high probability that the two items should not be merged. Although the searching may take time, the resulting decision confidence level merits the searching effort.

Figure 4:
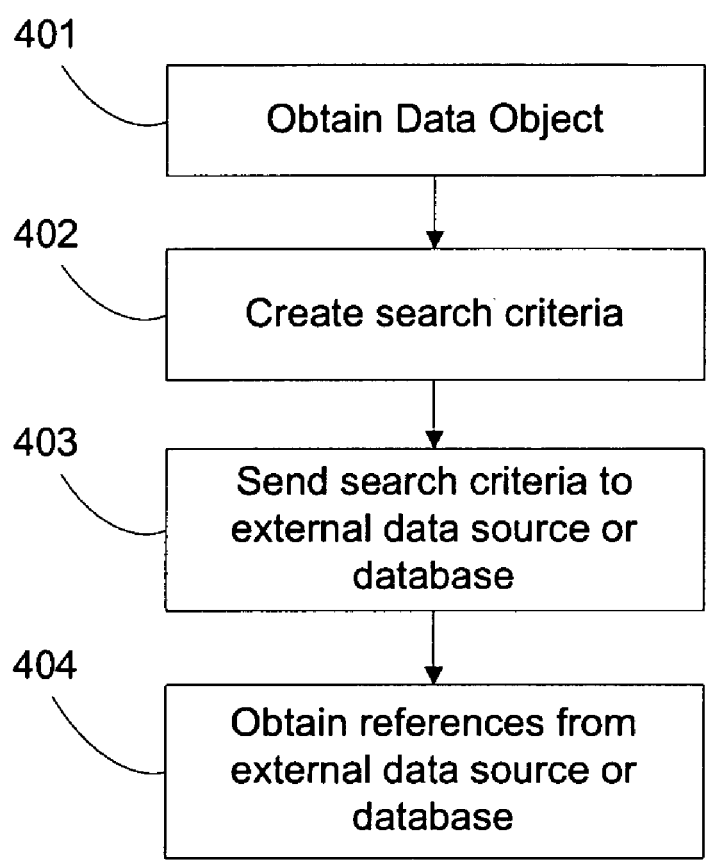
FIG. 4 shows an embodiment of the search step of FIG. 3 as it is implemented in one or more embodiments of the invention.

FIG. 4 shows an embodiment of the search 302 of FIG. 3. For a given search, the data object is obtained at 401 and serialized or otherwise used to create search criteria at 402. The string representing the data object and its attributes (e.g., the search criteria) is sent to the external data source (e.g., search engine or product catalog) or database at 403. One or more references from an external data source or database is obtained at 404.

Figure 5:
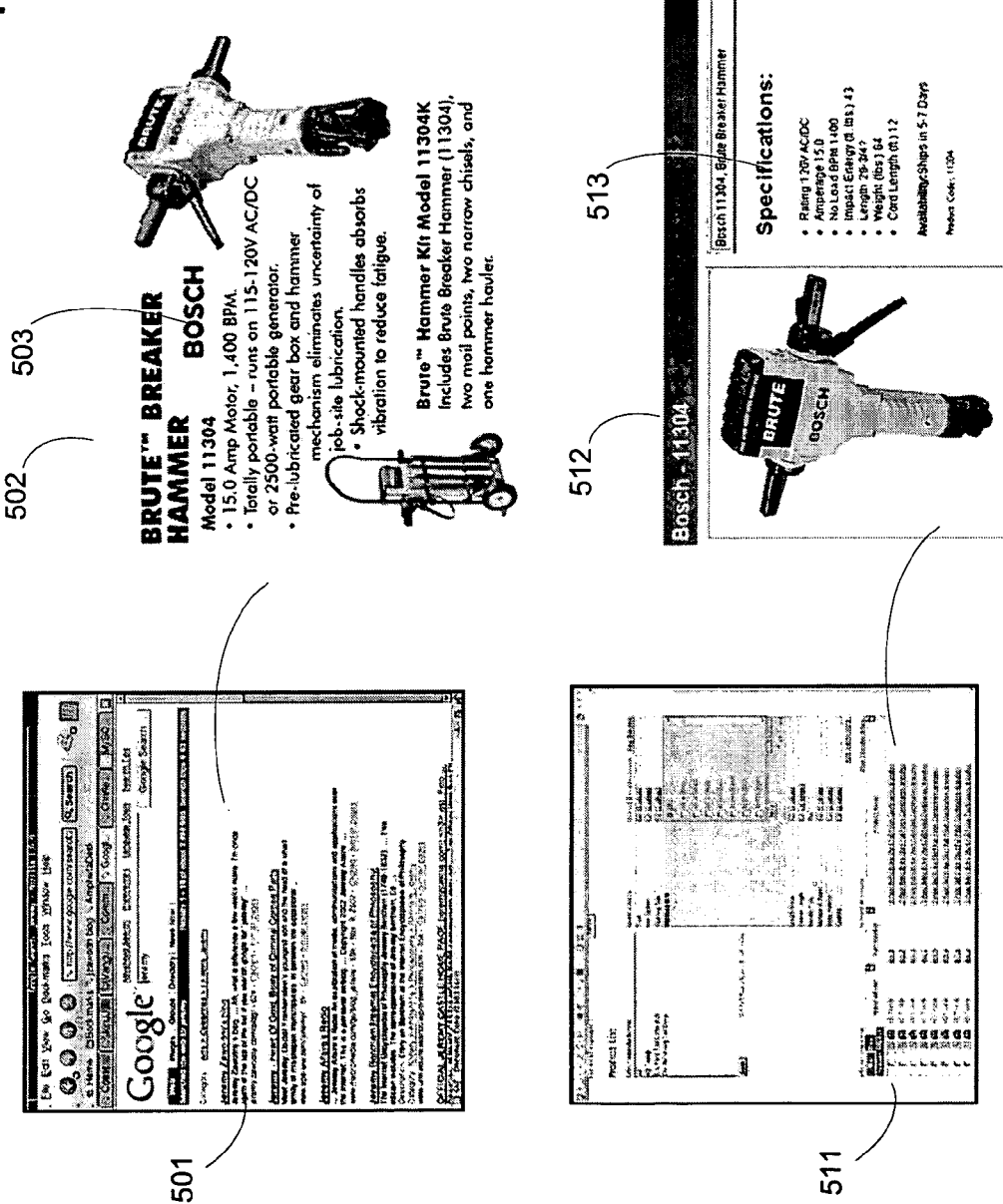
FIG. 5 shows example search result reference lists obtained by searching for data objects in accordance with one or more embodiments of the invention.

FIG. 5 shows example search result reference lists obtained by searching for data objects. Search engine result reference list 501 comprises a list of hyperlinks with URLs and a synopsis of each external reference found. In the example depicted, the hyperlinks point to an external reference 502 that comprises external reference data 503. Any item may be utilized to compare external references data. For instance, hyperlink data, URL data, a synopsis of data or the external reference data itself may be used for purposes of comparison. Product catalog result reference list 502 contains product hyperlinks and URLs for accessing the full product descriptions of the product summaries shown. Each hyperlink points to an external reference 512 containing external reference data 513. The hyperlinks themselves pointing to external reference 502 or 512 may be utilized in a comparison operation, for example by comparing URL parameters such as page number, product identifier number, product code or product category. Although the two resulting reference lists are shown graphically, embodiments of the invention may use application programming interfaces (APIs) to access the search engines/product catalogs without graphically displaying the results.

FIG. 6 illustrates an example of some data elements utilized in a comparison operation. In one or more embodiments of the invention the system is able to compare items from result lists in a variety of ways. For example, data object 601 can be serialized into text string 602 and then sent to a search engine for purposes of obtaining a result set. The resulting reference list is consulted or as shown a traversal to the hyperlink reference of the first reference list item is performed to retrieve the webpage representing the external reference in this case. The key words found on the external reference that are common to the serialized data object are stored for the comparison. An example of a common key word or attribute that has been found is common item 603 ("Brute"). Embodiments of the invention are configured to make use of commonalities as defined by the user or as determined by the system.

Figure 7:
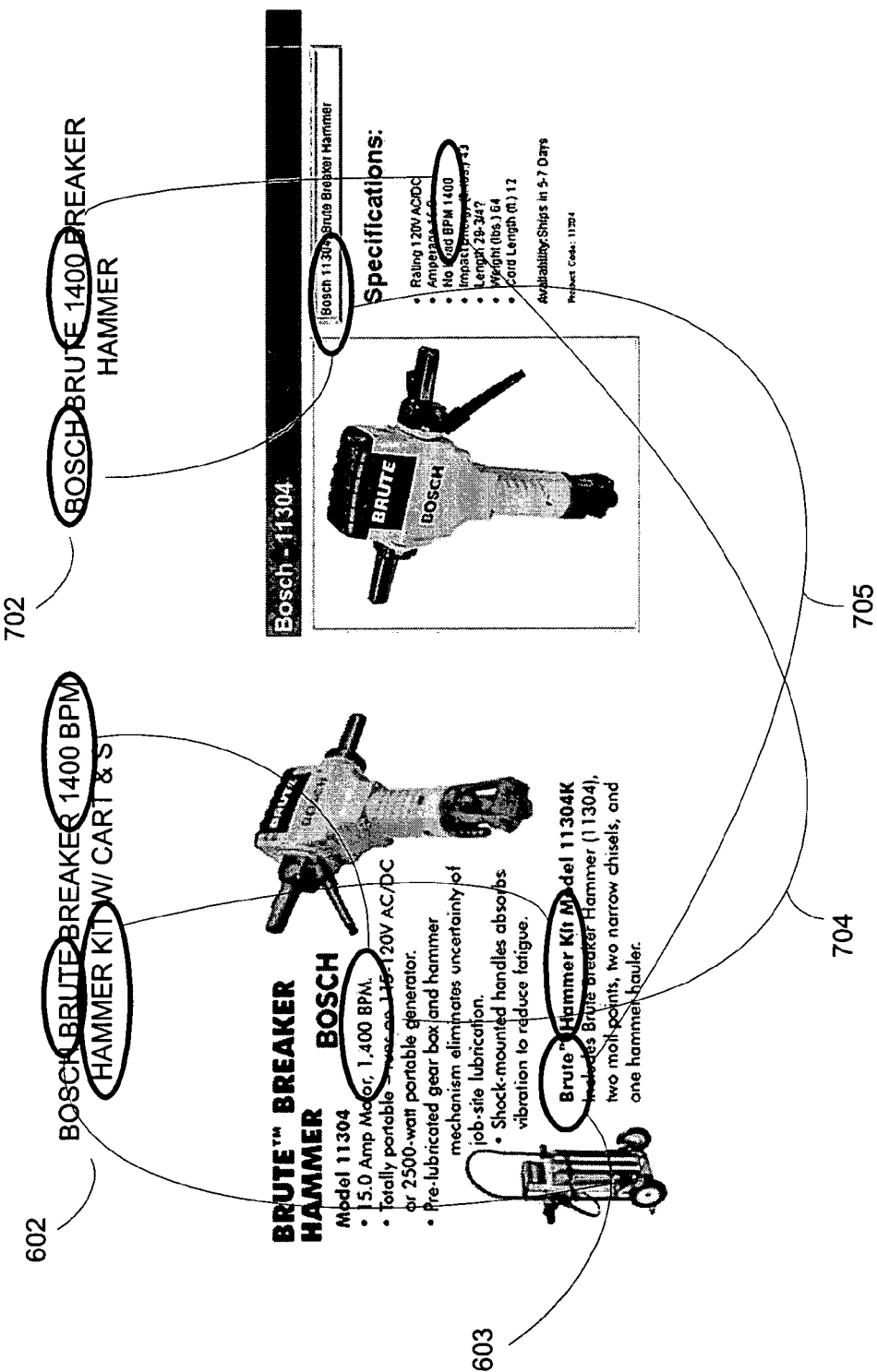
FIG. 7 shows a graphical illustration of some data elements utilized in the comparison of two data objects in accordance with one or more embodiments of the invention.

FIG. 7 shows a graphical illustration of some data elements utilized in the comparison of two data objects. By performing the same search for another item 702, one that is a candidate for consolidation with the first data object (as shown in FIG. 6 for example "BOSCH BRUTE 1400 BREAKER HAMMER") and referencing an external reference such as the hyperlink itself, the synopsis or the full webpage or in this case product catalog page at the URL associated with the hyperlink, a comparison may be performed. For example, if a high percentage of the hyperlinks returned by both searches are common, then the comparison is said to have a high probability of similarity. In addition, if the synopsis or web pages found (for example the top 10 web pages returned from the result) have many of the same key words, then likewise the comparison may be designated as a match. As shown in this example if a number of items on each page matches as per item 704 and item 705, then the probability of a match is high. Embodiments of the invention can make use of different methodologies for performing a comparison and can, for instance, use any other method of correlating or mathematically comparing data. It is possible, for example, to calculate the percentages of commonality based on key words or other identifiable similarities. In cases where the percentage of serialized data object attributes or groups thereof that are found in a given reference list, or at the web pages pointed to by the reference list may be returned from the comparison.

Classification and consolidation may be incorrectly attempted or may fail to occur for example when a data object has a missing or abbreviated attribute or coincidental information (for instance on an incoming invoice). In the case of missing or abbreviated attributes, these occurrences may cause a statistical type "0" error wherein a value is outside of a determined confidence level. In many cases, the missing or abbreviated attribute may cause a classification or consolidation to fail since the confidence interval determined signifies that there is not enough in common to perform the classification or consolidation. Classification and consolidation may be incorrectly attempted for example when a statistical type "I" error occurs wherein a change relationship exists that confuses the classification or consolidation model into thinking that a relationship does exist. Embodiments of the invention validate classification and consolidation decisions to preclude human intervention in all cases except where absolutely necessary. By correlating or performing any other comparison algorithm capable of determining the similarity between result sets of searches, a threshold may be met which determines that the external searches signify a high probability of a match or not. All search results may be cached for example to speed the process of classification validation or consolidation validation.

In the case of invoices being input data, for example, invoices from multiple vendors may contain an item categorized as "printer paper" in one invoice, while in another invoice the same item may be categorized as "office supplies" or "stationery." The item may be presented in invoices with multiple differing part numbers unique to each vendor as well. Embodiments of the invention may perform searches on the classification itself and data object in the case of a classification validation and determine whether the URLs or unstructured text returned from the search are within a threshold of commonality. Likewise, by searching for two data objects using external references, for example in product catalogs or on the Internet, the decision to merge may be validated or denied by comparing the result set of URLs, portions of the URLs such as page numbers or using text returned by the search. This allows for a high degree of alternate validation to occur before flagging one or more data objects for further investigation.

Hence a method and system for using external references to validate data objects has been described. While the invention herein disclosed has been described by means of specific embodiments and applications thereof, numerous modifications and variations could be made thereto by those skilled in the art without departing from the scope of the invention set forth in the claims.

What is claimed is:

1. A method for using external references to validate at least one data object consolidation comprising:
obtaining a first data object associated with a first product in a computer system of an organization;
searching external objects for said first data object using an Internet search engine to return a first external reference list comprising external data objects external to said organization, wherein said first external reference list comprises a first hyperlink to a first webpage;
obtaining a second data object associated with a second product in said computer system;
searching external data objects for said second data object using said Internet search engine to return a second external reference list comprising external data objects external to said organization, wherein said second external reference list comprises a second hyperlink to a second webpage;
obtaining the first hyperlink said first external reference list associated with said data object from said searching for said first data object;
obtaining the second hyperlink in said second external reference list associated with said second data object from said searching for said second data object;
comparing a first item from said first webpage to a second item from said second webpage to determine a match between said first product and said second product based on said external data objects based on similarity;
generating a validation confidence level of said match;
accepting an input consolidation confidence level;
affirming a consolidation decision of said first data object and said second data object if said validation confidence level compared to said input consolidation confidence level is within a threshold, wherein said match comprises a determination that said first product is identical to said second product; and
consolidating said first data object and said second data object in accordance with said consolidation decision.

2. The method of claim 1 further comprising:
accepting an input classification confidence level; and,
affirming a classification decision to classify said second data object as a first classification associated with said first data object if said validation confidence level compared to said input classification confidence level is within an acceptable threshold,
wherein said match comprises determining a same classification for said first data object and said second data object.

3. The method of claim 1 further comprising:
accepting an input classification confidence level; and,
repudiating a classification decision to classify said second data object as a first classification associated with said first data object if said validation confidence level compared to said input classification confidence level is beyond a threshold,
wherein said match comprises determining a same classification for said first data object and said second data object.

4. The method of claim 1 further comprising:
accepting an input consolidation confidence level; and,
repudiating a consolidation decision of said first data object and said second data object if said validation confidence level compared to said input consolidation confidence level is beyond an acceptable threshold,
wherein said match comprises a determination that said first product is identical to said second product.

5. The method of claim 1 wherein said comparing comprises correlating elements between said first external reference list and said second external reference list.

6. The method of claim 1 further wherein said comparing comprising a calculating a number of elements in common between said first external reference list and said second external reference list.

7. The method of claim 1 further wherein a first Uniform Resource Locator and a first unstructured text from said first external reference list and a second Uniform Resource Locator and a second unstructured text from said second external reference list comprise text from a search result provided by said Internet search engine.

8. A computer program product for validating data object classification and consolidation using external reference lists comprising:

a computer readable program code embodied in a computer system, having a processor and a memory, of an organization wherein said computer readable program code comprises a validation module that is configured to:

obtain a first data object associated with a first product;

search external data objects for said first data object using an Internet search engine to find a first external reference list, wherein said first external reference list comprises a first hyperlink to a first webpage, and wherein said external data objects are external to said organization;

obtain a second data object associated with a second product;

search external data objects for said second data object using said Internet search engine to find a second external reference list, wherein said second external reference list comprises a second hyperlink to a second webpage, and wherein said external data objects are external to said organization;

obtain the first hyperlink in said first external reference list associated with said first data object from said search for said first data object;

obtain the second hyperlink in said second external reference list associated with said second data object from said search for said second data object;

traverse said first hyperlink to retrieve said first webpage;

traverse said second hyperlink to retrieve said second webpage;

compare a first item of said first webpage and a second item from said second webpage to determine a match between said first product and said second product based on said external data objects;

generate a validation confidence level of said match based on said similarity;

accept an input consolidation confidence level;

affirm a consolidation decision of said first data object and said second data object if said validation confidence level compared to said input consolidation confidence level is within a threshold, wherein said match comprises a determination that said first product is identical to said second product; and consolidate said first data object and said second data object in accordance with said consolidation decision.

9. The computer program product of claim 8 wherein said computer readable program code is further configured to:

accept an input classification confidence level; and, affirm a classification decision to classify said second data object as a first classification associated with said first data object if said validation confidence level compared to said input classification confidence level is within a threshold, wherein said match comprises determining a same classification for said first data object and said second data object.

10. The computer program product of claim 8 wherein said computer readable program code is further configured to:

accept an input classification confidence level; and, repudiate a classification decision to classify said second data object as a first classification associated with said first data object if said validation confidence level compared to said input classification confidence level is beyond a threshold, wherein said match comprises determining a same classification for said first data object and said second data object.

11. The computer program product of claim 8 wherein said computer readable program code is further configured to:

accept an input consolidation confidence level; and, repudiate a consolidation decision of said first data object and said second data object if said validation confidence level compared to said input consolidation confidence level is beyond a threshold, wherein said match comprises a determination that said first product is identical to said second product.

12. The computer program product of claim 8 wherein said compare is configured to correlate elements between said first external reference list and said second external reference list.

13. The computer program product of claim 8 wherein said compare is configured to calculate a number of elements in common between said first external reference list and said second external reference list.

14. The computer program product of claim 8 wherein a first Uniform Resource Locator and a first unstructured text and a second Uniform Resource Locator and second unstructured text comprise text from a search result provided by said Internet search engine.

* * * * *